US009030749B2

United States Patent
Lescure et al.

(10) Patent No.: US 9,030,749 B2
(45) Date of Patent: May 12, 2015

(54) BIFOCAL HEAD-UP DISPLAY SYSTEM

(75) Inventors: Alban N. Lescure, Redmond, WA (US); Markus Duelli, Seattle, WA (US); Joshua O. Miller, Woodinville, WA (US); Lansing B. Evans, Snohomish, WA (US)

(73) Assignee: Microvision, Inc., Redmond, WA (US)

( * ) Notice: Subject to any disclaimer, the term of this patent is extended or adjusted under 35 U.S.C. 154(b) by 162 days.

(21) Appl. No.: 13/564,138

(22) Filed: Aug. 1, 2012

(65) Prior Publication Data
US 2014/0036374 A1 Feb. 6, 2014

(51) Int. Cl.
*G02B 27/14* (2006.01)
*G02B 27/01* (2006.01)

(52) U.S. Cl.
CPC .... *G02B 27/0101* (2013.01); *G02B 2027/0127* (2013.01)

(58) Field of Classification Search
CPC ............... G02B 27/0103; G02B 2027/0107; G02B 2027/0127; G02B 27/0025; G02B 27/0101; G02B 27/1066; G02B 27/1086; G02B 27/144; G02B 3/08; G02B 5/09; G02B 5/1861; G02B 5/30; G02B 2027/0109; G02B 2027/00
USPC .................................................. 359/619–630
See application file for complete search history.

(56) References Cited

U.S. PATENT DOCUMENTS

| 8,553,334 | B2 * | 10/2013 | Lambert et al. ............... 359/630 |
| 8,807,756 | B2 * | 8/2014 | Mizushima et al. ............ 353/31 |
| 2006/0071877 | A1 * | 4/2006 | Kanamori et al. ................ 345/7 |

* cited by examiner

*Primary Examiner* — Stephone B Allen
*Assistant Examiner* — Brandi Thomas
(74) *Attorney, Agent, or Firm* — Kevin D. Wills

(57) ABSTRACT

A bifocal head-up display system includes a projector, at least one projection surface in an intermediate image plane, and relay optics to direct a display image to a reflector in a vehicle operator's field of view. The display image includes two image portions focused at different distances from the vehicle operator. A first image portion focused at a first distance may include information related to vehicle operation, and a second image portion focused at a second distance may include to information related to extra-vehicular objects.

11 Claims, 6 Drawing Sheets

BIFOCAL HEAD-UP DISPLAY SYSTEM

FIELD

The present invention relates generally to display systems, and more specifically to head-up display systems.

BACKGROUND

Head-up display devices present data without requiring users to look away from their usual viewpoints. Head-up displays have historically seen extensive use in aircraft applications, and are now being utilized in application other than aircraft (e.g., automotive applications).

FIG. 1 shows angles of light when viewing a direct image. Light 102 from a pixel in a display 100 is collected by the eye lens within a user's eye 104 and is focused on the retina. The position of a pixel on the retina is determined by the angle of the light 102 of that pixel to the eye lens. The angle from a pixel to the eye lens depends on the distance from the display 100 to the eye 104 and its position within the image. Each pixel is characterized by a unique angle, and the eye sees the image at the real distance where the image is positioned.

FIG. 2 shows angles of light when viewing a virtual image. A virtual image identical to the real image of display 100 can be made using a smaller display 200 by imitating the angles of the real image at the eye lens using optics 202, 204. The entire image is presented to the eye as a collection of angles, where each pixel is represented by a unique angle. The eye sees a large image far away. The actual display 200 is smaller and much closer.

FIG. 3 shows a prior art head-up display that displays a virtual image. Head-up display (HUD) device 300 uses the techniques shown in FIG. 2 to present a large virtual image 302 to a vehicle operator 304. The image provided by HUD device 300 is reflected by the vehicle windshield into the vehicle operator's field of view, and presents the virtual image 302 focused at a distance d from the vehicle operator. The distance d is set by the optics and geometry of the system shown in FIG. 2.

DESCRIPTION OF EMBODIMENTS

Figure 1:
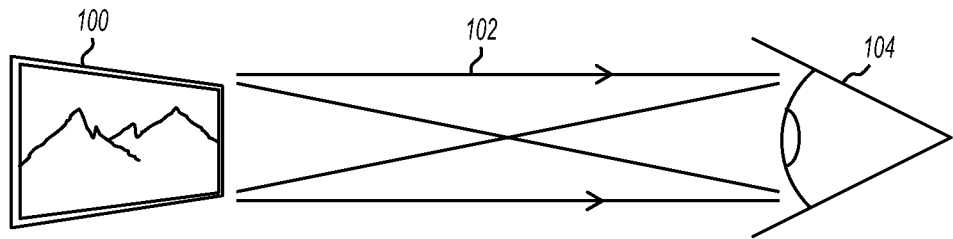
FIG. 1 shows angles of light when viewing a direct image.
Figure 2:
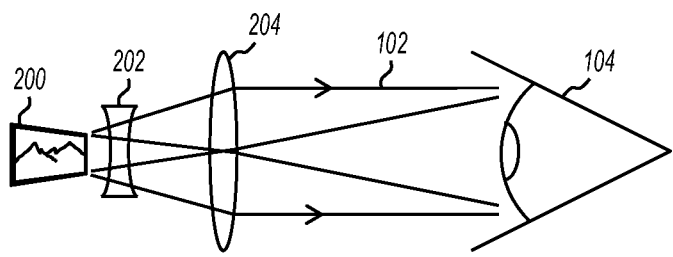
FIG. 2 shows angles of light when viewing a virtual image.
Figure 3:
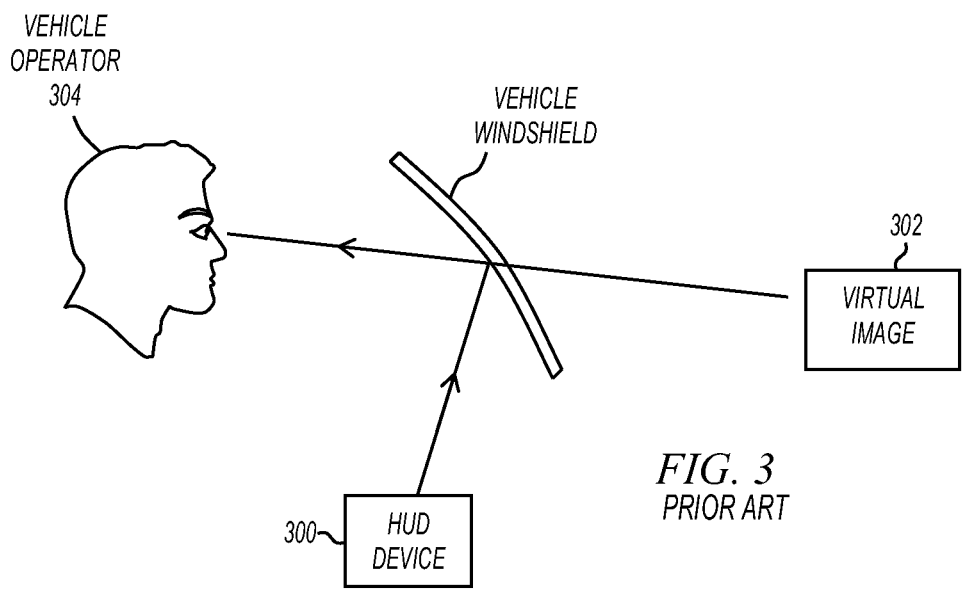
FIG. 3 shows a prior art head-up display that displays a virtual image.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 4:
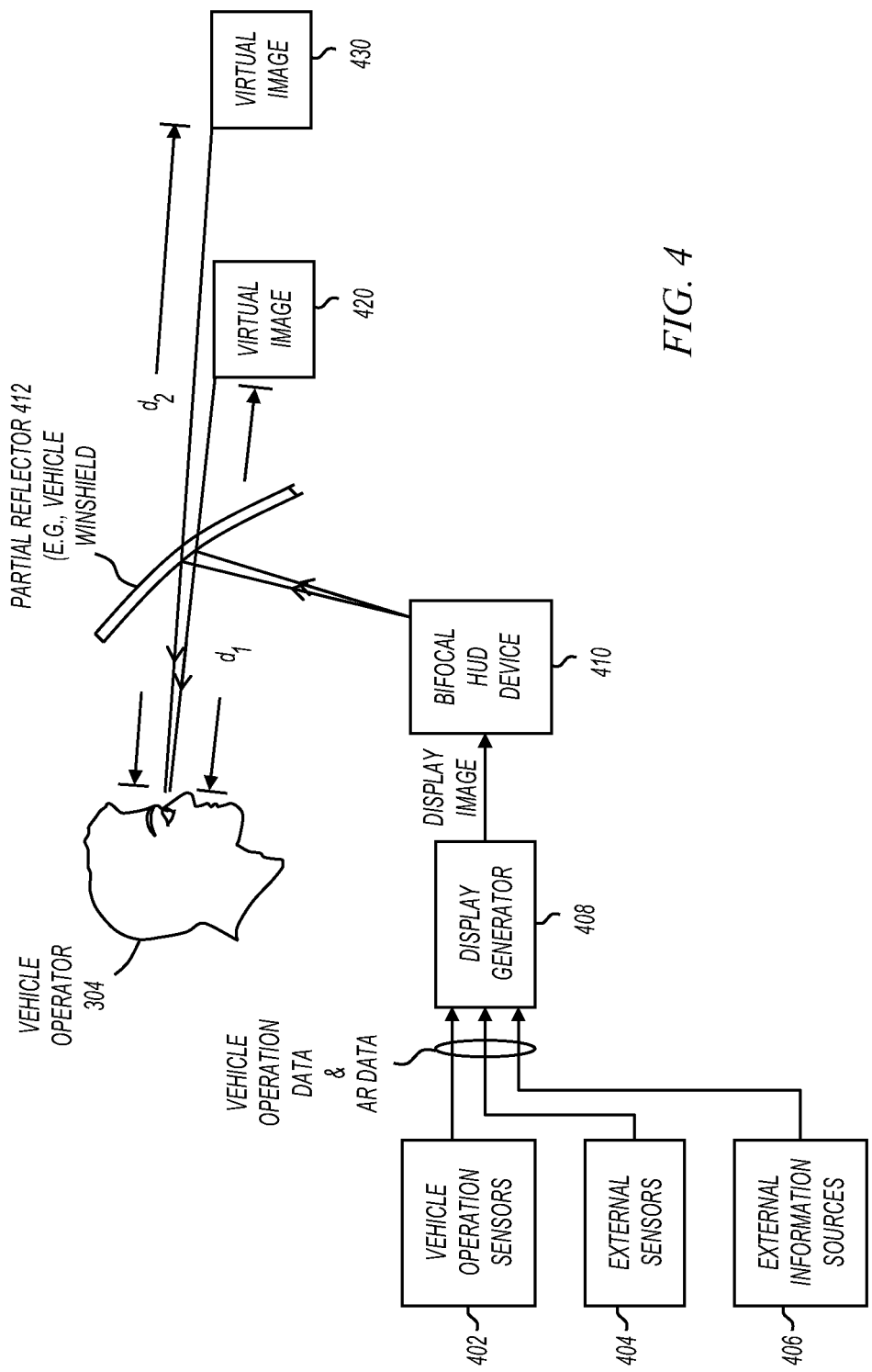
FIG. 4 shows a bifocal head-up display system in accordance with various embodiments of the present invention.

FIG. 4 shows a bifocal head-up display system in accordance with various embodiments of the present invention. The bifocal head-up display (HUD) system of FIG. 4 creates at least two virtual images 420, 430, focused in two different virtual image planes at different distances $d_1$, $d_2$, from the vehicle operator 304. In some embodiments, the virtual images 420 and 430 display different types of information. For example, virtual image 420 may display information related to vehicle operation such as information typically seen in an instrument cluster. Also for example, virtual image 430 may include information related to extra-vehicular objects such as environmental objects (e.g., signs, pedestrians, buildings, bridges, etc.) and traffic objects (e.g., vehicles, lanes, directions). In some embodiments, information related to extra-vehicular objects is referred to as "augmented reality" data or "contact analog" HUD data.

In some embodiments, virtual image 420 is focused closer to the vehicle operator 304 than virtual image 430. For example, virtual image 420 may display information related to vehicle operation and may be in a virtual image plane focused at two to four meters from the vehicle operator. Also for example, virtual image 430 may display information related to extra-vehicular objects and may be in a virtual image plane focused at seven to ten meters from the vehicle operator. In some embodiments, the difference between $d_1$ and $d_2$ is greater than one meter. In further embodiments, the difference between $d_1$ and $d_2$ is greater than five meters. $d_1$ and $d_2$ may take on any values without departing from the scope of the present invention.

In some embodiments, virtual image 420 is focused such that it will be displayed above the hood of the vehicle and virtual image 430 is focused such that it will be overlaid on the external scenery and the road, although this is not a limitation of the present invention.

The bifocal HUD system of FIG. 4 is also shown interoperating with vehicle operation sensors 402, external sensors 404, external information sources 406, and display generator 408. Vehicle operation sensors 402 include sensors that relate to vehicle operation such as speed sensors, pressure sensors (e.g., tire, oil, cooling system, etc.), temperature sensors, oxygen sensors, and the like. Vehicle operation sensors 402 provide sensor information to display generator 408. In some embodiments, the interface between vehicle operation sensors 402 and display generator 408 is an on-board diagnostics (OBD) interface, although this is not a limitation of the present invention.

External sensors 404 include sensors that sense extra-vehicular information such as light sensors (e.g., visible, infrared, etc.), distance sensors, motion sensors, moisture sensors, and the like. External sensors 404 provide sensor information to display generator 408. The interface between external sensors 404 and display generator 408 may be of any variety without departing from the scope of the present invention.

External information sources 406 may include any source of information beyond sensors 402 and 404. For example, external information sources 406 may include a global positioning system (GPS) receiver, a hard disk drive, an Internet connection, camera data aimed at assessing the viewer's eye positions and the direction he is looking at, or the like. Any type of information may be provided by external information sources 406. For example, external information sources 406 may provide map data, weather data, real-time traffic data, or the like.

Display generator 408 may be implemented in any fashion without departing from the scope of the present invention. For example, in some embodiments, display generator 408 includes a processor and a memory with instructions that when executed by the processor results in the generation of a display image.

In operation, display generator 408 receives data from vehicle operation sensors 402, external sensors 404, and external information sources 406, and generates an image to be displayed by bifocal HUD device 410. The data received from vehicle operation sensors 402, external sensors 404, and external information sources 406 may contain any type of data, including vehicle operation data and augmented reality (AR) data. In some embodiments, the vehicle operation data represents data received from vehicle operation sensors 402, and the AR data represents data received from external sensors 404 and external information sources 406, although this is not a limitation of the present invention. In some embodiments, the vehicle operation data populates a portion of the image to be displayed that is displayed as virtual image 420, and the AR data populates a portion of the image that is displayed as virtual image 430.

Bifocal HUD device 410 receives the image to be displayed and projects the image to a reflector in the vehicle operator's field of view. In some embodiments, the reflector is a partial reflector 412 such as a vehicle windshield. In other embodiments, the reflector is an aftermarket partial reflector that is situated between the vehicle operator and the vehicle windshield. Bifocal HUD device 410 may project the image onto any reflective surface without departing from the scope of the present invention.

Figure 5:
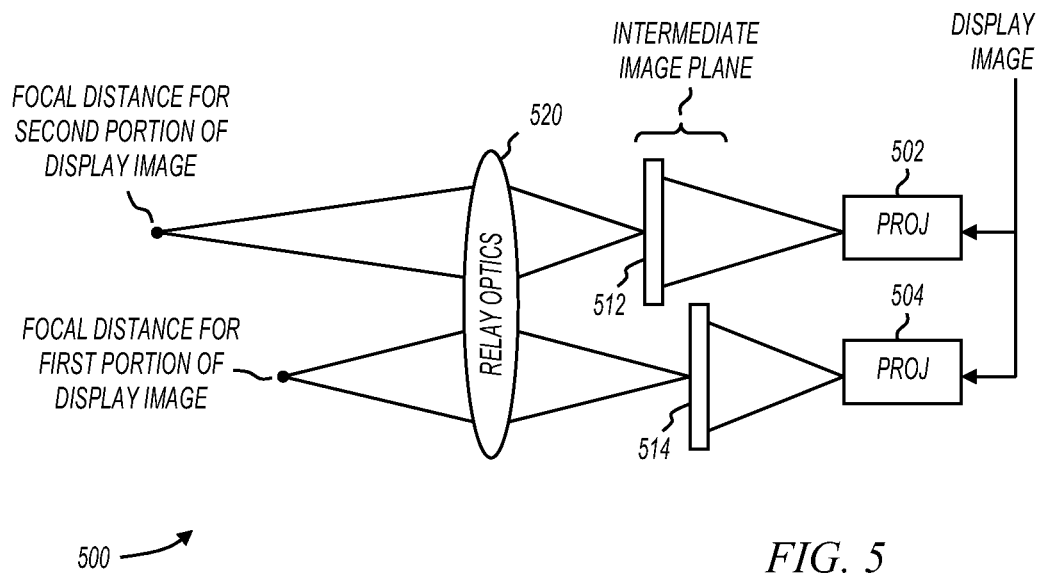
FIG. 5 shows a side view of a bifocal head-up display device with two projectors and two intermediate image planes in accordance with various embodiments of the present invention.

FIG. 5 shows a side view of a bifocal head-up display device with two projectors and two intermediate image planes in accordance with various embodiments of the present invention. Bifocal HUD device 500 represents an example HUD device that can be used in the system of FIG. 4 as bifocal HUD device 410. Bifocal HUD device 500 includes projectors 502 and 504, parallel projection surfaces 512 and 514, and relay optics 520.

In operation, projector 504 projects a first portion of the display image onto projection surface 514 at a first intermediate image plane, and projector 502 projects a second portion of the display image onto projection surface 512 at a second intermediate image plane. The intermediate image planes of projection surfaces 512 and 514 are positioned at different distances from relay optics 520, thereby imaging at different virtual image plane positions.

In some embodiments, the first portion of the display image provided to projector 504 includes vehicle operation data, and the focal distance for the first portion of the display image corresponds to $d_1$ (FIG. 4). Further, in some embodiments, the second portion of the display image provided to projector 502 includes augmented reality data, and the focal distance for the second portion of the display image corresponds to $d_2$ (FIG. 4).

Projectors 502 and 504 may be any type of projector suitable for use in a HUD device. For example, in some embodiments, projectors 502 and 504 are scanning laser projectors. In other embodiments, projectors 502 and 504 are panel-based projectors that utilize liquid crystal on silicon (LCOS) panels, micro-mirror panels, or the like.

Projection surfaces 512 and 514 may be any suitable projection surface. In some embodiments, projection surfaces 512 and 514 include structures and/or properties that provide additional functionality beyond being simply a surface onto which the image is displayed. For example, in some embodiments, projections surfaces 512 and 514 include micro-lens arrays (MLA) that function as exit pupil expanders (EPE) capable of operating as a numerical aperture (NA) converter that generates a larger eyebox.

Relay optics 520 direct the display image to a reflector in a vehicle operator's field of view and focus the first and second portions of the display image from projection surfaces 512, 514 at different distances from the vehicle operator. In some embodiments, relay optics 520 represents a single optical path that focuses both first and second portions of the display image at their respective focal distances. Relay optics 520 are shown as a single transmissive lens, although this is not a limitation of the present invention. For example, in some embodiments, relay optics 520 includes one or more reflective optical devices.

In some embodiments, projection surfaces 512, 514 and relay optics 520 form a bifocal focusing apparatus that focus a first portion of a display image at a first distance from a vehicle operator and that focus a second portion of a display image at a second distance from the vehicle operator. For example, the bifocal focusing apparatus may focus vehicle operation data at a first distance from the vehicle operator and focus augmented reality data at a second distance from the vehicle operator. Further, the bifocal focusing apparatus may focus an image relating to vehicle operation at a first distance from the vehicle operator, and focus an image relating to extra-vehicular objects at a second distance from the vehicle operator.

Figure 6:
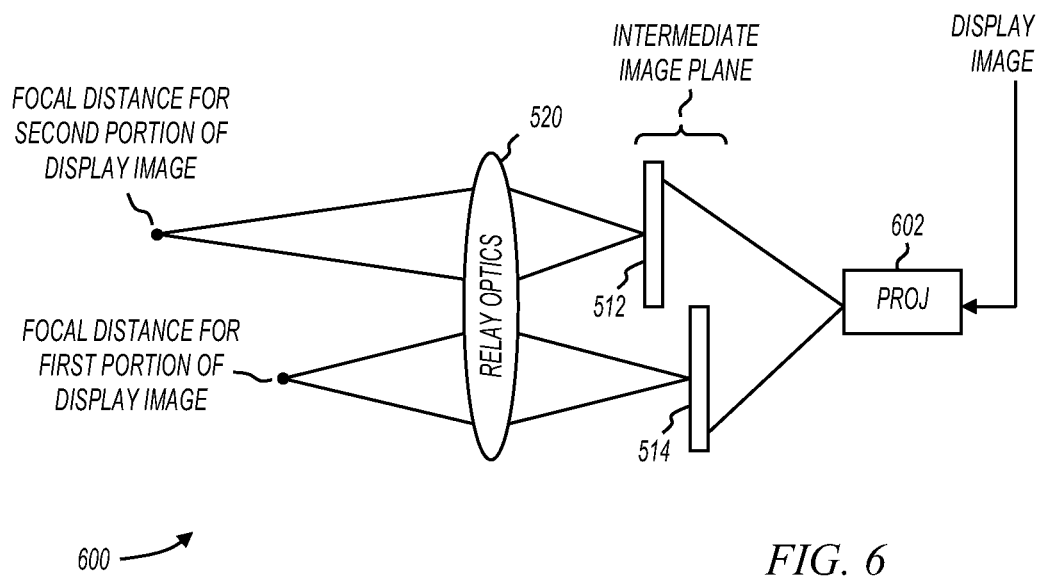
FIG. 6 shows a side view of a bifocal head-up display device with one projector and two intermediate image planes in accordance with various embodiments of the present invention.

FIG. 6 shows a side view of a bifocal head-up display device with one projector and two intermediate image planes in accordance with various embodiments of the present invention. Bifocal HUD device 600 represents an example HUD device that can be used in the system of FIG. 4 as bifocal HUD device 410. Bifocal HUD device 600 includes parallel projection surfaces 512 and 514, and relay optics 520, all of which are described above with reference to FIG. 5. Bifocal HUD device 600 also includes projector 602.

Projector 602 may be any type of projector suitable for use in a HUD device. For example, in some embodiments, projector 602 is a scanning laser projector. In other embodiments, projector 602 is a panel-based projector that utilizes a liquid crystal on silicon (LCOS) panel, a micro-mirror panel, or the like.

In operation, projector 602 receives the display image and projects it onto projection surfaces 512 and 514, which occupy separate intermediate image planes at different distances from projector 602. In some embodiments, a first portion of the display image is projected onto projection surface 514, and a second portion of the display image is projected onto projection surface 512. Relay optics then direct the display image to a reflector in the vehicle operator's field of view and focus the first and second portions of the display image at different distances from the vehicle operator.

Figure 7:
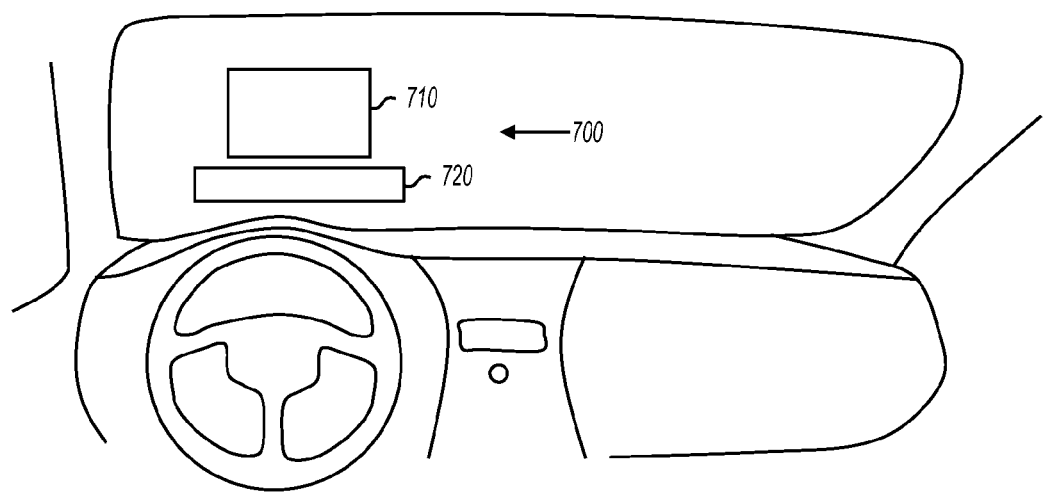
FIG. 7 shows a bifocal head-up display image in a vehicle operator's field of view in accordance with various embodiments of the present invention.

FIG. 7 shows a bifocal head-up display image in a vehicle operator's field of view in accordance with various embodiments of the present invention. Display image 710 is seen by the vehicle operator as a virtual image out in front of the vehicle windshield. In some embodiments, first portion 720 of the display image 700 is focused closer to the vehicle operator than is second portion 710 of display image 700. For example, first portion 720 may correspond to virtual image 420 (FIG. 4), and second portion 710 may correspond to virtual image 430 (FIG. 4). In some embodiments, image portion 720 is focused at two to three meters from the vehicle operator, and image portion 710 is focused at seven to ten meters from the vehicle operator.

As shown in FIG. 7, first portion 720 of the display image is focused at a first distance from the vehicle operator and second portion 710 of the display image appears above the first portion of the image and is focused at a second distance greater than the first distance.

Figure 8:
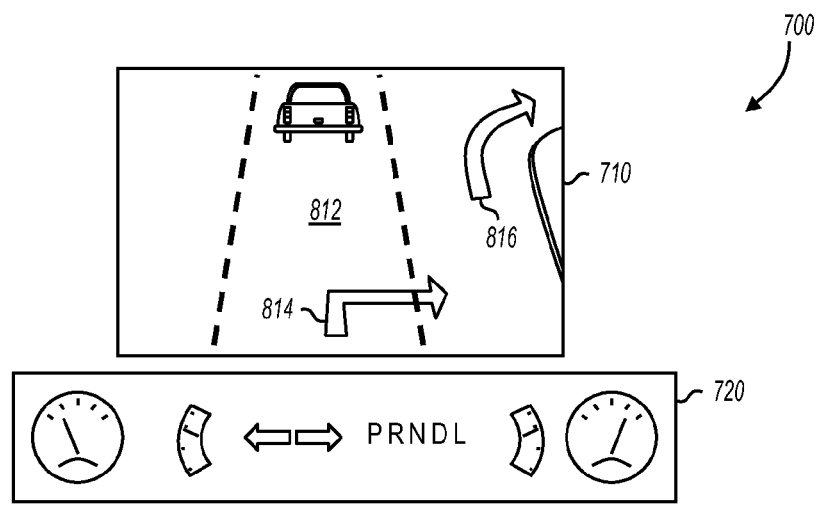
FIG. 8 shows a bifocal head-up display image that includes vehicle operation information and augmented reality information in accordance with various embodiments of the present invention.

FIG. 8 shows a bifocal head-up display image that includes vehicle operation information and augmented reality information in accordance with various embodiments of the present invention. First portion 720 of display image 700 displays vehicle operation data that relates to vehicle operation. In some embodiments, this is information that might otherwise be displayed in a conventional instrument cluster on the vehicle dash.

Second portion 710 of display image 700 displays augmented reality information related to extra-vehicular objects. For example, road surface 812 is an extra-vehicular object that is in the vehicle operator's field of view. Arrows 814 and 816 are displayed by the HUD device in the second portion 710 of display image 700 as navigation information. In some embodiments, arrows 814 and 816 are generated by display generator 408 (FIG. 4) in response to GPS information and map information provided by external information sources 406. Arrows 814 and 816 are only examples of augmented reality data; the type and/or quantity of augmented reality data may vary greatly without departing from the scope of the present invention.

In some embodiments, first portion 720 of display image 700 is focused at two to three meters from the vehicle operator, effectively placing the image over the hood of, or slightly in front of, the vehicle. Also in some embodiments, second portion 710 of display image 700 is focused at seven to ten meters from the vehicle operator, allowing the vehicle operator to view the augmented reality data while viewing the extra-vehicular environment. Focal distances described herein are provided as examples only. The actual focal distances and differences between the focal distances may vary greatly without departing from the scope of the present invention.

Figure 9:
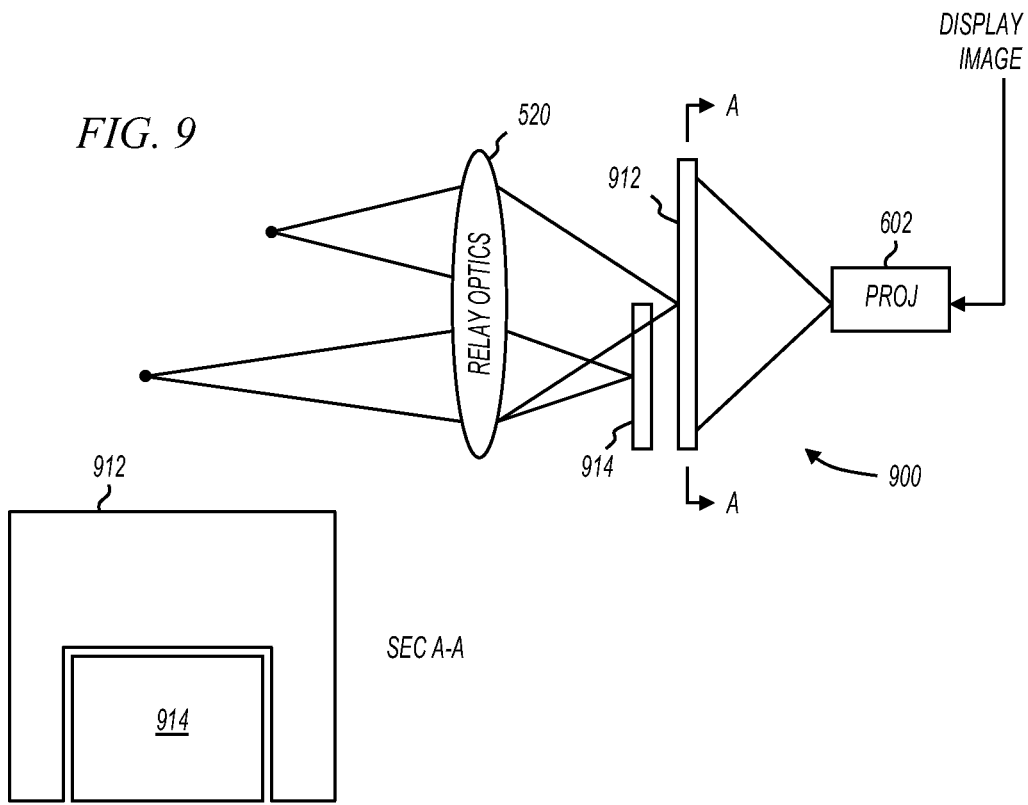
FIG. 9 shows a bifocal head-up display device with two intermediate image planes in accordance with various embodiments of the present invention.

FIG. 9 shows a bifocal head-up display device with two intermediate image planes in accordance with various embodiments of the present invention. Bifocal HUD device 900 represents an example HUD device that can be used in the system of FIG. 4 as bifocal HUD device 410. Bifocal HUD device 900 includes relay optics 520 and projector 602, all of which are described above with reference to FIGS. 5 and 6. Bifocal HUD device 900 also includes parallel projection surfaces 912 and 914 in two different intermediate projection planes.

Figure 10:
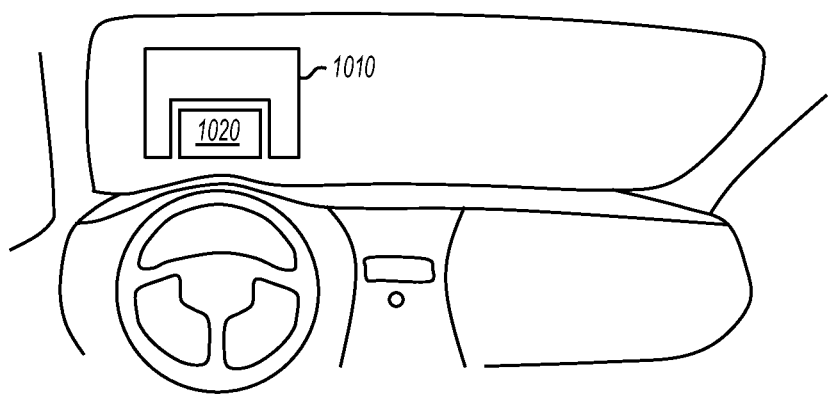
FIG. 10 shows a bifocal head-up display image in a vehicle operator's field of view in accordance with various embodiments of the present invention.

Section A-A shows that projection surface 914 is rectangular, and projection surface 912 surrounds projection surface 914 on three sides. Referring now to FIG. 10, the first portion 1010 of the display image as seen by the vehicle operator corresponds to the portion of the display image that is projected onto projection surface 912, and the second portion 1020 of the display image as seen by the vehicle operator corresponds to the portion of the display image that is projected onto projection surface 914. Second portion 1020 is inset in first portion 1010, and the separate portions may be focused at different distances from the vehicle operator as described above.

As seen in FIGS. 9 and 10, the first and second projection surfaces 912, 914 are arranged to form a first portion of the image focused at a first distance from the vehicle operator and a second portion of the image surrounding the first portion of the image on at least three sides and focused at a second distance, wherein the first distance is greater than the second distance. This is an example of a "custom shaped" bifocal projection arrangement, where one virtual image is inset into another. In some embodiments, custom shaped bifocal arrangements of two virtual images are produced where two virtual images have different shapes and/or relative locations. For example, some embodiments include nonrectangular virtual images where one virtual image is surrounded on all sides by another virtual image. Multiple virtual images may be of any size and shape, and may be in any position relative to each other, without departing from the scope of the present invention. Further, although only two virtual images are shown focused in two image planes, in some embodiments, more than two virtual images are produced in more than two virtual image planes.

Figure 11:
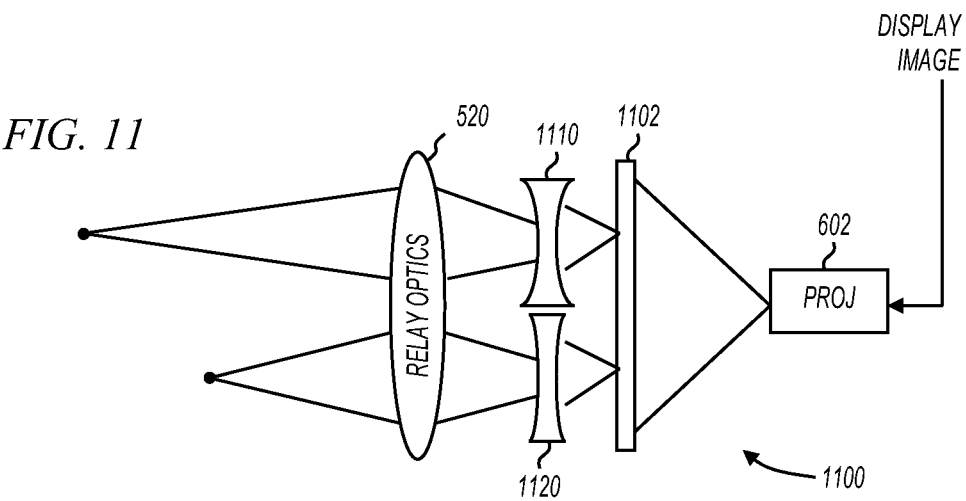
FIG. 11 shows a side view of a bifocal head-up display device with separate optical elements for separate image portions in accordance with various embodiments of the invention.

FIG. 11 shows a side view of a bifocal head-up display device with separate optical elements for separate image portions in accordance with various embodiments of the invention. Bifocal HUD device 1100 represents an example HUD device that can be used in the system of FIG. 4 as bifocal HUD device 410. Bifocal HUD device 1100 includes relay optics 520 and projector 602, all of which are described above with reference to FIGS. 5 and 6. Bifocal HUD device 1100 also includes projection surface 1102 and optical elements 1110 and 1120.

Bifocal HUD device 1100 includes a single projection surface 1102 that occupies a single intermediate image plane. The dual focus capability is achieved through the addition of negative power optical elements 1110 and 1120 (e.g., dioptrics, catoptrics, catadioptrics, etc.) in the optical path, after the intermediate image plane. This has the advantage of changing the position of the virtual image plane as a function of the system's added power (hence the possibility of having spatially segregated images on different image planes if two or more different optical systems are inserted).

Figure 12:
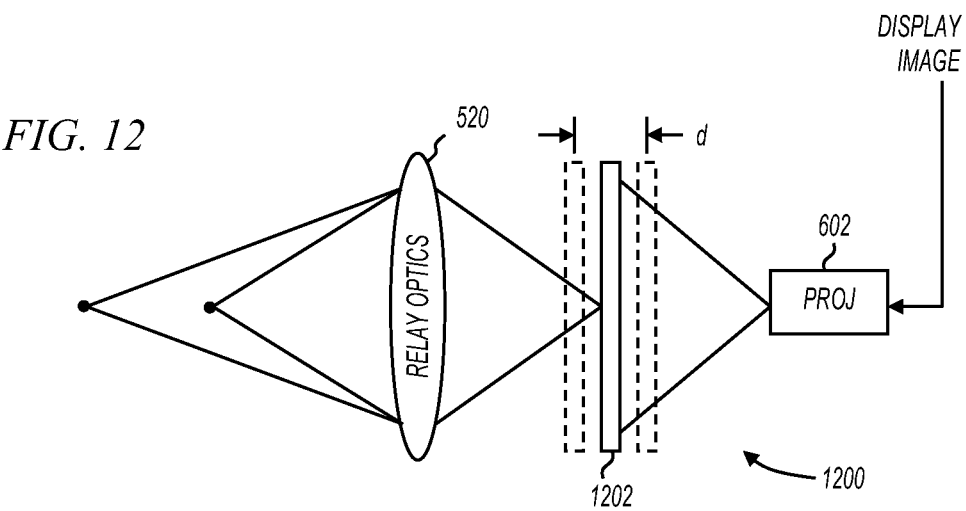
FIG. 12 shows a bifocal head-up display device with a movable intermediate image plane in accordance with various embodiments of the invention.

FIG. 12 shows a bifocal head-up display device with a movable intermediate image plane in accordance with various embodiments of the invention. Bifocal HUD device 1200 represents an example HUD device that can be used in the system of FIG. 4 as bifocal HUD device 410. Bifocal HUD device 1200 includes relay optics 520 and projector 602, all of which are described above with reference to FIGS. 5 and 6. Bifocal HUD device 1200 also includes a movable projection surface 1202 that occupies an intermediate image plane that is a variable distance from projector 602 and relay optics 520.

In operation, the dual focus capability is achieved through the motion of projection surface through a calibrated distance d, which enables the imaging of the intermediate image plane at different virtual image planes through the relay optics 520. In some embodiments, projection screen 1202 moves at a frequency higher than 120 Hz, enabling two virtual images to be displayed with a refresh rate at 60 Hz. In these embodiments, bifocal HUD device 1200 may be operated with a single projector 602, and a single set of relay optics 520.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A head-up display device to display an image in a vehicle operator's field of view, the head-up display device having a bifocal projection apparatus to focus a first portion of the image at a first distance from the vehicle operator, and to focus a second portion of the image at a second distance further from the vehicle operator than the first distance, wherein the bifocal projection apparatus comprises a projector, relay optics, and a movable projection surface that occupies an intermediate image plane between the projector and the relay optics, and wherein the projection surface is operable to move through a calibrated distance faster than a refresh rate of the projector to enable imaging of the intermediate image plane at different virtual image planes through the relay optics.

2. The head-up display device of claim 1 wherein the bifocal projection apparatus displays the first portion of the image below the second portion of image.

3. The head-up display device of claim 1 wherein the first portion of the image displays information related to vehicle operation.

4. The head-up display device of claim 1 wherein the second portion of the image displays augmented reality information related to extra-vehicular objects.

5. The head-up display device of claim 1 wherein the second portion of the image is inset in the first portion of the image.

6. The head-up display device of claim 1 wherein the bifocal projection apparatus comprises a scanning laser projector.

7. A head-up display device comprising:
 a projector to project an image in a vehicle operator's field of view, wherein the image includes vehicle operation data and augmented reality data; and
 a bifocal focusing apparatus to focus the vehicle operation data at a first distance from the vehicle operator and to focus the augmented reality data at a second distance from the vehicle operator, wherein the bifocal focusing apparatus comprises relay optics and a movable projection surface that occupies an intermediate image plane between the projector and the relay optics, and wherein the projection surface is operable to move through a calibrated distance faster than a refresh rate of the projector to enable imaging of the intermediate image plane at different virtual image planes through the relay optics.

8. The head-up display device of claim 7 wherein the second distance is greater than the first distance.

9. The head-up display device of claim 8 wherein a difference between the first distance and the second distance is greater than one meter.

10. The head-up display device of claim 8 wherein a difference between the first distance and the second distance is greater than five meters.

11. The head-up display device of claim 7 wherein the augmented reality data comprises information related to vehicle navigation.

\* \* \* \* \*